UNITED STATES PATENT OFFICE.

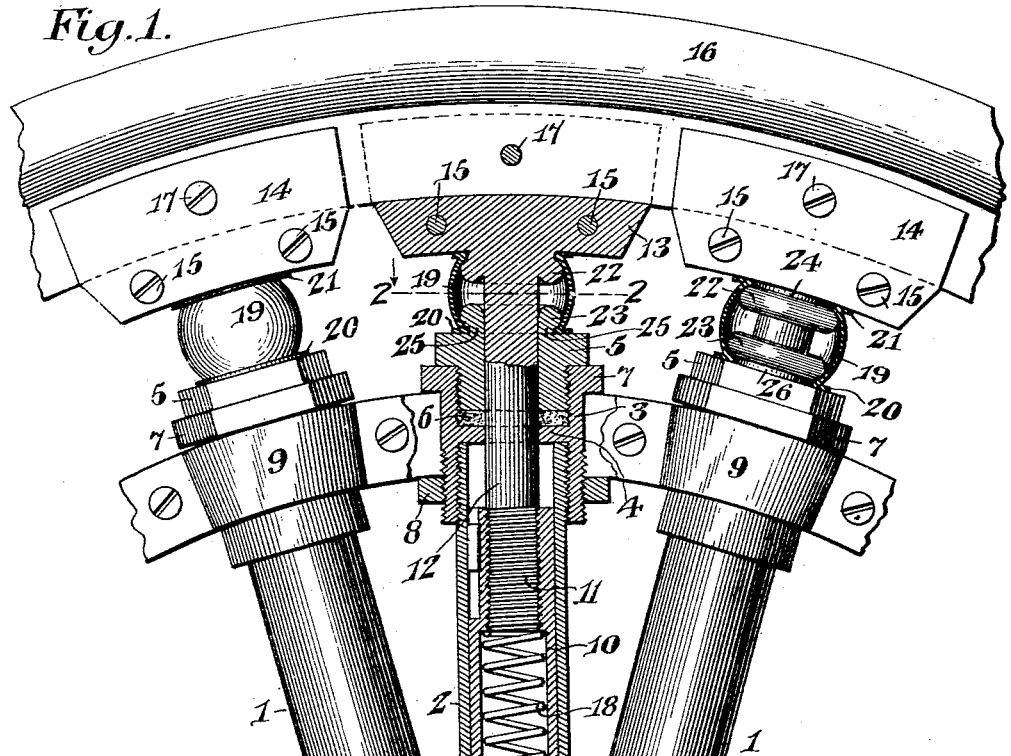
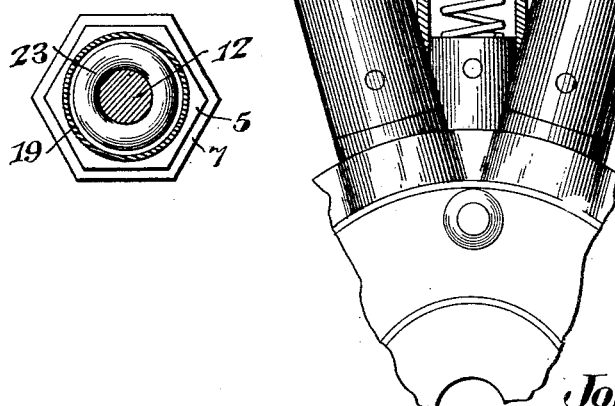

JOHN T. HELBERT, OF TIMBERVILLE, VIRGINIA, ASSIGNOR TO FAHRNEY WHEEL CORPORATION, OF TIMBERVILLE, VIRGINIA, A CORPORATION OF VIRGINIA.

RESILIENT WHEEL.

1,122,274.      Specification of Letters Patent.      Patented Dec. 29, 1914.

Application filed March 30, 1914. Serial No. 828,372.

*To all whom it may concern:*

Be it known that I, JOHN T. HELBERT, a citizen of the United States, residing at Timberville, in the county of Rockingham and State of Virginia, have invented a new and useful Resilient Wheel, of which the following is a specification.

The invention relates to improvements in resilient wheels, more especially that shown and described in an application filed November 21, 1913, by J. J. Fahrney, Serial No. 802,247.

The object of the present invention is to improve the construction of that type of resilient wheels having tubular spokes and yieldably supported plungers telescoping into the same, and to provide a simple, practical and durable device, adapted to exclude dust, dirt, and moisture from the telescoping parts.

With these and other objects in view the invention consists in the construction and novel combination of parts hereinafter fully described, illustrated in the accompanying drawing, and pointed out in the claim hereto appended, it being understood that various changes in the form, proportion, size and minor details of construction, within the scope of the claim, may be resorted to without departing from the spirit or sacrificing any of the advantages of the invention.

In the drawing—Figure 1 is an elevation, partly in section, of a portion of a resilient wheel. Fig. 2 is a sectional view on the line 2—2 of Fig. 1.

Like numerals of reference designate corresponding parts in all the figures of the drawing.

In the accompanying drawing, in which is illustrated the preferred embodiment of the invention, 1 and 2 designate tubular or hollow spokes constructed and arranged as shown and described in the aforesaid application, and equipped at their outer ends with sleeves 3 having a threaded engagement with the outer ends of the tubular spokes 1 and 2, and provided at a point intermediate of their ends with an interior lateral web 4. Each sleeve is interiorly threaded at the outer portion for the reception of a nut 5, which is adapted for holding a packing 6 against the web 4. The outer end of each sleeve is formed with a circumferential outstanding flange 7, and is exteriorly threaded at the inner portion for the reception of a nut 8. The outer portions of the spokes 1 and 2 are connected by matching rings 9 having half-rounds, as described in the said application, and embracing the sleeves between the flanges 7 and the nuts 8. Within each of the spokes is a slidable sleeve 10 interiorly threaded at its outer portion to receive an inner threaded portion 11 of a plunger stem 12, extending through an appropriate passage in the web 4 and nut 5, as well as the packing 6, and terminating at the outer end beyond the nut in a laterally extended channeled head 13. One of the side faces 14 of the head is removable, being detachably secured to the main portion of the head by screws or bolts 15. A tire 16 of suitable elastic or semi-elastic material is secured in the channels of the heads by screws or bolts 17. The tire supporting plungers are cushioned by coiled springs 18, supported at their inner ends and having their outer portions extending into the slidable sleeves 10.

In order to exclude dust, dirt, and moisture from the telescoping tire supporting plungers and the tubular spokes, the wheel is equipped with flexible collars or sleeves 19, designed to be constructed of rubber or other suitable material, and surrounding the outer portions of the plunger stems and provided at their inner and outer ends with flat, outwardly extending annular flanges 20 and 21, which are fitted against the outer faces of the nuts and the inner faces of the tire supporting heads of the plungers. The sleeves 19 have outwardly curved or bulging sides, and in order to prevent the sleeves from becoming caught and pinched between the plungers and the nuts, these parts are provided with annular ribs 22 and 23. The ribs 22 and 23 are preferably formed integral with the plunger stems and the nuts, and the rib 22 is spaced from the inner face of the tire supporting head of the plunger to provide an intervening groove 24 to receive the outer edge of the flexible collar, and the rib 23 of the nut is connected with the latter by a reduced neck portion 25 and forms an intervening groove 26 between it and the outer face of the nut to receive the inner edge of the flexible collar. The inner and outer ribs, which constitute guards, are substantially semi-circular in cross section, and present rounded outer portions which not only tend to prevent the flexible collar from being caught between them, but which operate to force the collar outwardly should a portion of the collar in the collapsing of the latter extend inwardly between the guard ribs. The flexible sleeves, which cover the outer portions of the plunger stems, form an efficient dust proof and water proof covering for the exposed outer portion of the telescopic parts, and they enable the wheel to travel over muddy and dusty roads, without permitting any grit or moisture to penetrate into the tubular spokes and injure the faces of the slidable parts. The flexible tubes are designed to be made sufficiently elastic and of a size to enable them to be stretched over the ribs into tight engagement with the same, so as to form water tight joints or connections at their inner and outer edges. Also, the rounding of the guard ribs tends to cause the terminal portions of the flexible sleeve to wedge the annular flanges against the flat coacting surfaces of the nut and the tire supporting head of the plunger.

What is claimed is:

A wheel of the class described, including a hollow spoke, a tire supporting plunger provided with a head and having a stem extending into the hollow spoke, said stem being provided at its outer portion with an annular rounded guard rib spaced from the head to provide an intervening groove, a member connected with and arranged at the outer end of the hollow spoke and having an opening through which the stem passes, said member being provided with an annular rounded guard rib having its rounded portion spaced from the said member to provide an intervening groove, and a flexible sleeve stretched over the rounded guard ribs and fitting into the said grooves and provided with outwardly extending flanges arranged against the adjacent faces of the head and the said member, said ribs presenting convex faces to each other and to the collar to prevent the latter from being caught and pinched between them.

In testimony that I claim the foregoing as my own, I have hereto affixed my signature in the presence of two witnesses.

JOHN T. HELBERT.

Witnesses:
W. L. RIPE,
B. W. HILE.

Copies of this patent may be obtained for five cents each, by addressing the "Commissioner of Patents, Washington, D. C."